United States Patent
Ni et al.

(10) Patent No.: US 11,031,906 B2
(45) Date of Patent: Jun. 8, 2021

(54) CURRENT-VOLTAGE CURVE SCAN METHOD FOR PHOTOVOLTAIC MODULE, AND OPTIMIZER

(71) Applicant: SUNGROW POWER SUPPLY CO., LTD., Anhui (CN)

(72) Inventors: Hua Ni, Hefei Anhui (CN); Yanfei Yu, Hefei Anhui (CN); Yunfei Zou, Hefei Anhui (CN); Zongjun Yang, Hefei Anhui (CN); Liang Zhan, Hefei Anhui (CN); Liying Xue, Hefei Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 653 days.

(21) Appl. No.: 15/888,482

(22) Filed: Feb. 5, 2018

(65) Prior Publication Data
US 2018/0234051 A1    Aug. 16, 2018

(30) Foreign Application Priority Data

Feb. 10, 2017  (CN) .......................... 201710073662.5

(51) Int. Cl.
*H02S 50/10*      (2014.01)
*H02S 40/32*      (2014.01)
(Continued)

(52) U.S. Cl.
CPC .............. *H02S 50/10* (2014.12); *H02J 3/383* (2013.01); *H02M 3/155* (2013.01); *H02S 40/32* (2014.12);
(Continued)

(58) Field of Classification Search
CPC .......... H02S 50/10; H02S 50/00; H02S 40/32; H02S 40/38; H02M 3/155; H02J 3/383
(Continued)

(56) References Cited

U.S. PATENT DOCUMENTS 4,163,194 A  *  7/1979  Ross ....................... H02S 50/10
                                                  324/761.01
4,528,503 A      7/1985  Cole
(Continued)

FOREIGN PATENT DOCUMENTS

| CN | 102770822 A | 11/2012 |
| CN | 103777672 A | 5/2014 |
| TW | 200939505 A | 9/2009 |

OTHER PUBLICATIONS

Extended European Search Report corresponding to Application No. 18154654.0-1211; dated Apr. 11, 2018.
(Continued)

*Primary Examiner* — Daniel Kessie
*Assistant Examiner* — Brian K Baxter
(74) *Attorney, Agent, or Firm* — Cantor Colburn LLP

(57) ABSTRACT

An IV curve scan method for a photovoltaic module and an optimizer are provided. The optimizer receives an IV curve scan signal and controls an output voltage of the photovoltaic module corresponding to the IV curve scan signal to change from an open-circuit voltage to a preset minimum voltage according to a preset rule, while photovoltaic module connected to another optimizer can still operate normally, so that the system can operate normally. Then the optimizer uploads IV curve data of the photovoltaic module corresponding to the IV curve scan signal, to complete an IV curve scan on a single photovoltaic module.

19 Claims, 9 Drawing Sheets

(51) Int. Cl.
*H02M 3/155* (2006.01)
*H02J 3/38* (2006.01)
*H02S 40/38* (2014.01)
*H02S 50/00* (2014.01)
*H04B 1/00* (2006.01)

(52) U.S. Cl.
CPC .............. *H02S 40/38* (2014.12); *H02S 50/00* (2013.01); *H04B 1/0003* (2013.01)

(58) Field of Classification Search
USPC .......................................................... 307/64
See application file for complete search history.

(56) References Cited

U.S. PATENT DOCUMENTS

| | | | | |
|---|---|---|---|---|
| 2008/0143188 | A1* | 6/2008 | Adest | ...................... H02J 1/102 307/82 |
| 2008/0150366 | A1* | 6/2008 | Adest | .................. H02M 3/1582 307/77 |
| 2009/0234601 | A1 | 9/2009 | Wu et al. | |
| 2012/0043818 | A1* | 2/2012 | Stratakos | ............. H03K 17/122 307/77 |
| 2012/0212066 | A1* | 8/2012 | Adest | ...................... H02J 3/386 307/82 |
| 2013/0054037 | A1 | 2/2013 | Ikawa et al. | |
| 2014/0077608 | A1 | 3/2014 | Nosaka et al. | |

OTHER PUBLICATIONS

SIPO First Office Action for corresponding CN Application No. 201710073662.5; dated Mar. 2, 2018.
"Base Device Behavior Specification," ZigBee Alliance; Feb. 24, 2016, pp. 1-87.
"P1901.2/D011.00 Draft Standard for Low Frequency (less than 500 kHz) Narrow Band Power Line Communications for Smart Grid Applications," Institute of Electrical and Electronics Engineer, Inc.; 2013, pp. 1-271.

* cited by examiner

CURRENT-VOLTAGE CURVE SCAN METHOD FOR PHOTOVOLTAIC MODULE, AND OPTIMIZER

CROSS REFERENCE TO RELATED APPLICATION

The present application claims priority under 35 U.S.C. § 119 to Chinese Patent Application No. 201710073662.5 filed on Feb. 10, 2017, the entire content of which is incorporated herein by reference.

TECHNICAL FIELD

The present disclosure relates to the technical field of photovoltaic power generation, and in particular to a current-voltage (IV) curve scan method for a photovoltaic module, and an optimizer.

BACKGROUND

Global photovoltaic industry and solar energy market grow rapidly due to an increasing global demand on energy, a high cost of traditional energy sources, and an increasing attention on environmental problems. Defects such as rosin joint and fracture are inevitably generated in producing and using a photovoltaic module, which is a key element of a solar energy power generation system in photovoltaic industry. Some defects are invisible to human eyes, and have to be detected by means of a dedicated device or method.

In conventional technologies, an IV tester is generally used as a detection device. The IV tester detects an electrical performance of the photovoltaic module by performing a solar radiation simulation on the photovoltaic module to simulate an operation condition of the photovoltaic module under the solar radiation. However, the IV tester works in an offline detection way. After modules are put into use, a large-scale module detection cannot be achieved, that is, operation statuses of the photovoltaic modules cannot be detected during the system operation.

Additionally, for a photovoltaic system, there is also an online detection method for detecting an IV curve of a string using a photovoltaic inverter. With the method, an IV curve for the entire string in a certain range can be scanned by controlling a bus voltage. However, this solution can only obtain the IV curve for the entire string, while cannot obtain an IV curve for a single photovoltaic module. Therefore, a fault in a certain photovoltaic module cannot be detected with this solution.

SUMMARY

In view of the above, a current-voltage (IV) curve scan method for a photovoltaic module and an optimizer are provided according to the present disclosure, to address the issues in conventional technologies that an operation status of a photovoltaic module cannot be detected during the system operation and an IV curve scan cannot be performed on a single photovoltaic module.

In view of the above, the following technical solutions are provided according to the present disclosure.

An IV curve scan method for a photovoltaic module is provided. The IV curve scan method is applied to an optimizer in a photovoltaic generation system. An input end of the optimizer is connected to at least one photovoltaic module. Output ends of multiple said optimizers are connected in series with each other and then connected to an inverter. The IV curve scan method for the photovoltaic module includes:

receiving an IV curve scan signal;

controlling an output voltage of the photovoltaic module corresponding to the IV curve scan signal to change from an open-circuit voltage to a preset minimum voltage according to a preset rule, to complete an IV curve scan; and recording IV curve data of the photovoltaic module corresponding to the IV curve scan signal.

Preferably, after the recording the IV curve data of the photovoltaic module corresponding to the IV curve scan signal, the IV curve scan method for the photovoltaic module further includes:

comparing the IV curve data with feature data of a preset IV curve, determining whether the IV curve data is abnormal, and uploading an abnormity signal if the IV curve data is abnormal; or uploading the IV curve data.

Preferably, the preset rule is at least one of a voltage decreasing rule with a fixed voltage difference, a parabolic voltage decreasing rule and a voltage decreasing rule with a fixed duty ratio change rate.

An optimizer is provided. The optimizer is applied to a photovoltaic generation system. An input end of the optimizer is connected to at least one photovoltaic module. Output ends of multiple said optimizers are connected in series with each other and then connected to an inverter. The optimizer includes:

a direct current/direct current (DC/DC) converting circuit, configured to control output power of the photovoltaic module connected to the optimizer;

a current sensor, configured to perform a detection for acquiring an output current of the photovoltaic module;

a voltage sensor, configured to perform a detection for acquiring an output voltage of the photovoltaic module;

a communication circuit, configured to receive and forward an IV curve scan signal; and a controller, configured to receive the IV curve scan signal forwarded by the communication circuit, control the output voltage of the photovoltaic module corresponding to the IV curve scan signal to change from an open-circuit voltage to a preset minimum voltage according to a preset rule to complete an IV curve scan, and record IV curve data of the photovoltaic module corresponding to the IV curve scan signal.

Preferably, the controller is further configured to compare the IV curve data with feature data of a preset IV curve, determine whether the IV curve data is abnormal, and upload an abnormity signal via the communication circuit if the IV curve data is abnormal; or the communication circuit is further configured to upload the IV curve data.

Preferably, the communication circuit is a power line carrier communication circuit or a wireless communication circuit.

Preferably, the current sensor is configured to detect a current of an inductor in the DC/DC converting circuit, and the controller is further configured to calculate the output current of the photovoltaic module based on the current of the inductor and a duty ratio of a switch transistor between the inductor in the DC/DC converting circuit and the photovoltaic module.

Alternatively, the current sensor is configured to detect an output current of the DC/DC converting circuit. In this case, the optimizer further includes another voltage sensor configured to detect an output voltage of the DC/DC converting circuit; and the controller is further configured to calculate power of the DC/DC converting circuit based on both the output voltage and the output current of the DC/DC converting circuit, and calculate the output current of the photovoltaic module based on the output voltage of the photovoltaic module in accordance with a power balance principle.

Preferably, the optimizer further includes a first diode and a first auxiliary power source.

An anode of the first diode is connected to a positive electrode of the photovoltaic module, a cathode of the first diode is connected to a positive electrode of an input end of the first auxiliary power source, and the first diode is configured to prevent the first auxiliary power source from losing power as the voltage of the photovoltaic module decreases during the IV curve scan performed by the optimizer.

A negative electrode of the input end of the first auxiliary power source is connected to a negative electrode of the photovoltaic module, and the first auxiliary power source is configured to supply power to the optimizer.

Preferably, in a case that a negative electrode of an input end of the DC/DC converting circuit is connected to a negative electrode of an output end of the DC/DC converting circuit, and a positive electrode of the input end of the DC/DC converting circuit is not connected to a positive electrode of the output end of the DC/DC converting circuit, the optimizer further includes a second diode, a third diode and a second auxiliary power source.

An anode of the second diode is connected to a positive electrode of the photovoltaic module, an anode of the third diode is connected to a positive electrode of the output end of the DC/DC converting circuit, and cathodes of the second diode and the third diode are both connected to a positive electrode of an input end of the second auxiliary power source.

A negative electrode of the input end of the second auxiliary power source is connected to a negative electrode of the photovoltaic module, and the second auxiliary power source is configured to supply power to the optimizer.

Alternatively, in the case that a positive electrode of an input end of the DC/DC converting circuit is connected to a positive electrode of an output end of the DC/DC converting circuit, and a negative electrode of the input end of the DC/DC converting circuit is not connected to a negative electrode of the output end of the DC/DC converting circuit, the optimizer further includes a fourth diode, a fifth diode and a third auxiliary power source.

A cathode of the fourth diode is connected to a negative electrode of the photovoltaic module, a cathode of the fifth diode is connected to a negative electrode of the output end of the DC/DC converting circuit, and anodes of the fourth diode and the fifth diode are both connected to a negative electrode of an input end of the third auxiliary power source.

A positive electrode of the input end of the third auxiliary power source is connected to a positive electrode of the photovoltaic module, and the third auxiliary power source is configured to supply power to the optimizer.

Alternatively, in the case that a negative electrode of an input end of the DC/DC converting circuit is not connected to a negative electrode of an output end of the DC/DC converting circuit and a positive electrode of the input end of the DC/DC converting circuit is not connected to a positive electrode of the output end of the DC/DC converting circuit, the optimizer further includes a sixth diode, a seventh diode, an eighth diode, a ninth diode and a fourth auxiliary power source.

An anode of the sixth diode is connected to a positive electrode of the photovoltaic module, an anode of the seventh diode is connected to the positive electrode of the output end of the DC/DC converting circuit, and cathodes of the sixth diode and the seventh diode are both connected to a positive electrode of an input end of the fourth auxiliary power source;

A cathode of the eighth diode is connected to a negative electrode of the photovoltaic module, a cathode of the ninth diode is connected to the negative electrode of the output end of the DC/DC converting circuit, and anodes of the eighth diode and the ninth diode are both connected to a negative electrode of the input end of the fourth auxiliary power source.

The fourth auxiliary power source is configured to supply power to the optimizer.

Preferably, the optimizer further includes an energy storage circuit.

The energy storage circuit is connected between the positive electrode and the negative electrode of the input end of the first auxiliary power source, and is configured to supply power to the first auxiliary power source during the IV curve scan performed by the optimizer.

It can be seen from the above solutions that, in the IV curve scan method for the photovoltaic module provided according to the present disclosure, after receiving the IV curve scan signal, the optimizer controls the output voltage of the photovoltaic module corresponding to the IV curve scan signal to change from the open-circuit voltage to the preset minimum voltage according to the preset rule, while the photovoltaic module connected to another optimizer can still operate normally, so that the system can operate normally. Then, the optimizer uploads the IV curve data of the photovoltaic module corresponding to the IV curve scan signal, to achieve the IV curve scan on the single photovoltaic module. Different optimizers perform the IV curve scans on the respective photovoltaic modules in response to the corresponding IV curve scan signals, thereby solving the problem in the conventional technologies that the operation status of the photovoltaic module cannot be detected during the system operation and the IV curve scan cannot be performed on a single photovoltaic module.

BRIEF DESCRIPTION OF THE DRAWINGS

The drawings to be used in the description of the embodiments or the conventional technology will be described briefly as follows, so that the technical solutions according to the embodiments of the present disclosure or according to the conventional technology will become clearer. It is apparent that the drawings in the following description only illustrate some embodiments of the present disclosure. For those skilled in the art, other drawings may be obtained according to these drawings without any creative work.

DETAILED DESCRIPTION OF THE EMBODIMENTS

The technical solutions according to the embodiments of the present disclosure will be described clearly and completely as follows in conjunction with the drawings. It is apparent that the described embodiments are only a few rather than all of the embodiments according to the present disclosure. Any other embodiments obtained by those skilled in the art based on the embodiments in the present disclosure without any creative efforts fall within the protection scope of the present disclosure.

An IV curve scan method for a photovoltaic module is provided according to the present disclosure, to address the issues in conventional technologies that an operation status of a photovoltaic module cannot be detected during the system operation and an IV curve scan cannot be performed on a single photovoltaic module.

Figure 1:
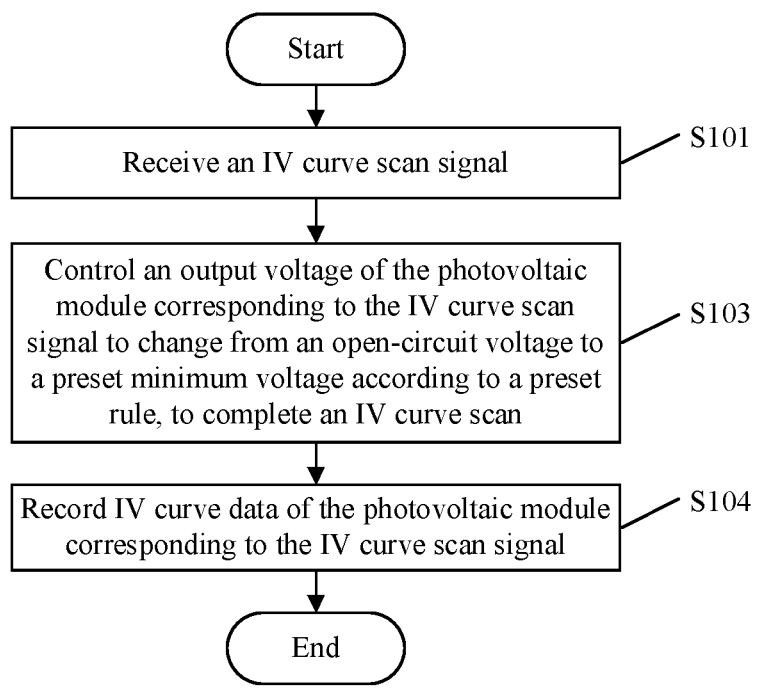
FIG. 1 is a flowchart of an IV curve scan method for a photovoltaic module according to an embodiment of the present disclosure.

The IV curve scan method for the photovoltaic module is applied to an optimizer in a photovoltaic generation system. An input end of the optimizer is connected to at least one photovoltaic module. Output ends of multiple said optimizers are connected in series with each other and then connected to an inverter. The IV curve scan method for the photovoltaic module is shown in FIG. 1 and includes steps S101, S103 and S104.

In S101, an IV curve scan signal is received.

In S103, an output voltage of a photovoltaic module corresponding to the IV curve scan signal is controlled to change from an open-circuit voltage to a preset minimum voltage according to a preset rule, to complete an IV curve scan.

In S104, IV curve data of the photovoltaic module corresponding to the IV curve scan signal is recorded.

In a normal operation status of the photovoltaic generation system, the optimizer operates normally and outputs power to the inverter. When receiving an IV curve scan signal sent by an upper computer or any intelligent control device, the optimizer stops operating so that a photovoltaic module corresponding to the optimizer is in an open-circuit status. Then, the optimizer adjusts the output voltage of the photovoltaic module from the open-circuit voltage of the photovoltaic module to the preset minimum voltage to complete the whole IV curve scan. The preset minimum voltage may have a value of 0 Volt or greater than 0 Volt. The IV curve data of the photovoltaic module is recorded after required by a sensor. The IV curve data includes a voltage value and a current value of each point in the IV curve scan.

Preferably, the preset rule is at least one of a voltage decreasing rule with a fixed voltage difference, a parabolic voltage decreasing rule and a voltage decreasing rule with a fixed duty ratio change rate.

In a practical application, depending on the preset rule, the optimizer may control the output voltage of the photovoltaic module to decrease from the open-circuit voltage to the preset minimum voltage gradually with a fixed voltage difference (such as 0.5 Volt), or according to the parabolic voltage decreasing rule, or according to a voltage decreasing rule with a fixed duty ratio change rate. The parabolic voltage decreasing rule refers to that the voltage decreases fast when close to the open-circuit voltage of the photovoltaic module or the preset minimum voltage, and decreases slowly when in an intermediate portion of the range from the open-circuit voltage to the preset minimum voltage. The voltage decreasing rule with a fixed duty ratio change rate refers to that a controlled duty ratio of the optimizer changes from an initial value with a fixed step size. For example, the controlled duty ratio increases from 0 to 1 with a fixed step size of 0.01. This method is an open-loop control which is simple to be implemented. Therefore, the preset rule is not limited herein, as long as the whole IV curve scan can be performed on the photovoltaic module according to the preset rule. All possible preset rules are in the protection scope of the present disclosure.

With the IV curve scan method for the photovoltaic module according to the embodiment, when the optimizer controls its corresponding photovoltaic module to perform the IV curve scan, a photovoltaic module connected to another optimizer can still operate normally, so that the system can operate normally. In addition, different optimizers can perform IV curve scans on the respective photovoltaic modules in response to the corresponding IV curve scan signals, thereby solving the problems in the conventional technologies that the operation status of the photovoltaic module cannot be detected during the system operation and the IV curve scan cannot be performed on a single photovoltaic module.

Figure 2:
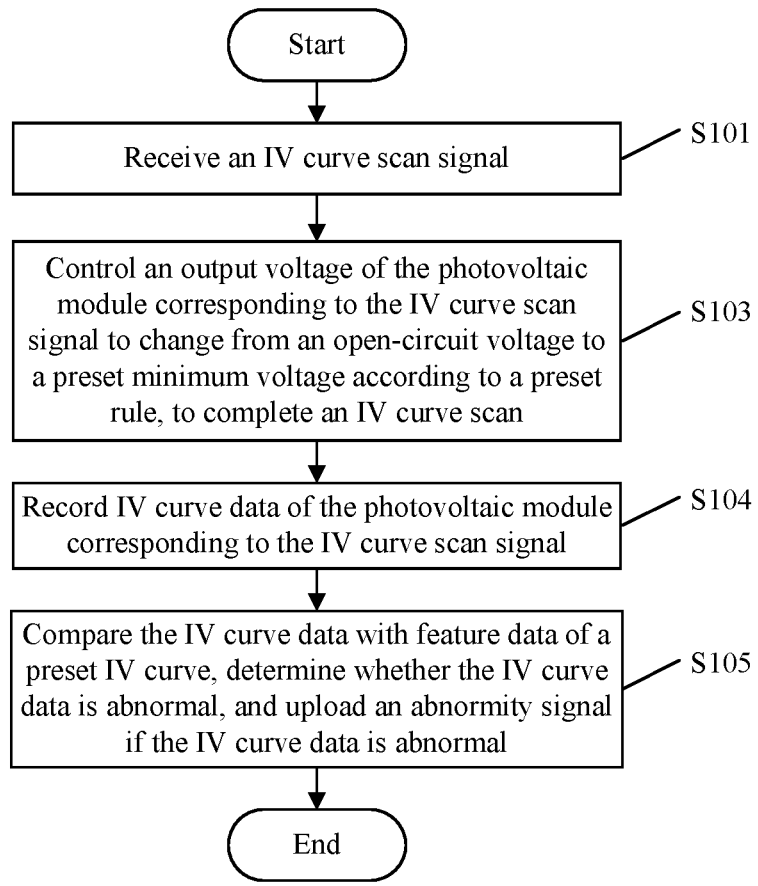
FIG. 2 is a flowchart of an IV curve scan method for a photovoltaic module according to an embodiment of the present disclosure.

Preferably, based on FIG. 1, the IV curve scan method for the photovoltaic module further includes step S105 after step S104, as shown in FIG. 2.

In step S105, the IV curve data is compared with feature data of a preset IV curve, it is determined whether the IV curve data is abnormal; and an abnormity signal is uploaded if the IV curve data is abnormal.

Figure 3:
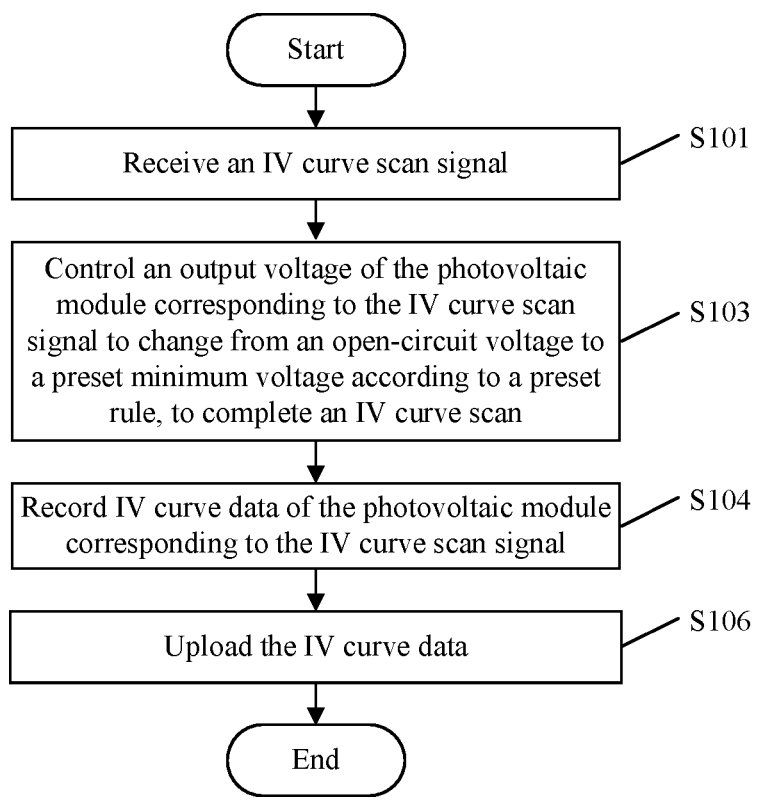
FIG. 3 is a flowchart of an IV curve scan method for a photovoltaic module according to an embodiment of the present disclosure.

Alternatively, based on FIG. 1, the IV curve scan method for the photovoltaic module further includes step S106 after step S104, as shown in FIG. 3.

In step S106, the IV curve data is uploaded.

In addition, steps S101, S105 and S106 may respectively include different operations depending on different connection modes between the optimizer and a terminal (a local monitoring device and/or an Internet cloud).

In the case that the optimizer is in a wired connection to the terminal, step S101 includes receiving an IV curve scan signal, which is transmitted by the terminal sequentially via a data collector and the inverter; step S105 includes comparing the IV curve data with the feature data of the preset IV curve, determining whether the IV curve data is abnormal, and uploading an abnormity signal to the terminal sequentially via the inverter and the data collector if the IV curve data is abnormal; and step S106 includes uploading the IV curve data of the photovoltaic module corresponding to the IV curve scan signal to the terminal sequentially via the inverter and the data collector.

In the case that the optimizer is wirelessly connected to the terminal, step S101 includes receiving, by using a wireless communication technology, an IV curve scan signal which is transmitted by the terminal via a gateway; step S105 includes comparing the IV curve data with the feature data of the preset IV curve, determining whether the IV curve data is abnormal, and uploading an abnormity signal to the terminal via the gateway by using the wireless communication technology if the IV curve data is abnormal; and step S106 includes uploading the IV curve data of the photovoltaic module corresponding to the IV curve scan signal to the terminal via the gateway by using the wireless communication technology.

In a practical application, the communication mode between the optimizer and the Internet cloud may be determined based on an application environment, which is not limited herein. All possible communication modes fall within the protection scope of the present disclosure.

Figure 4:
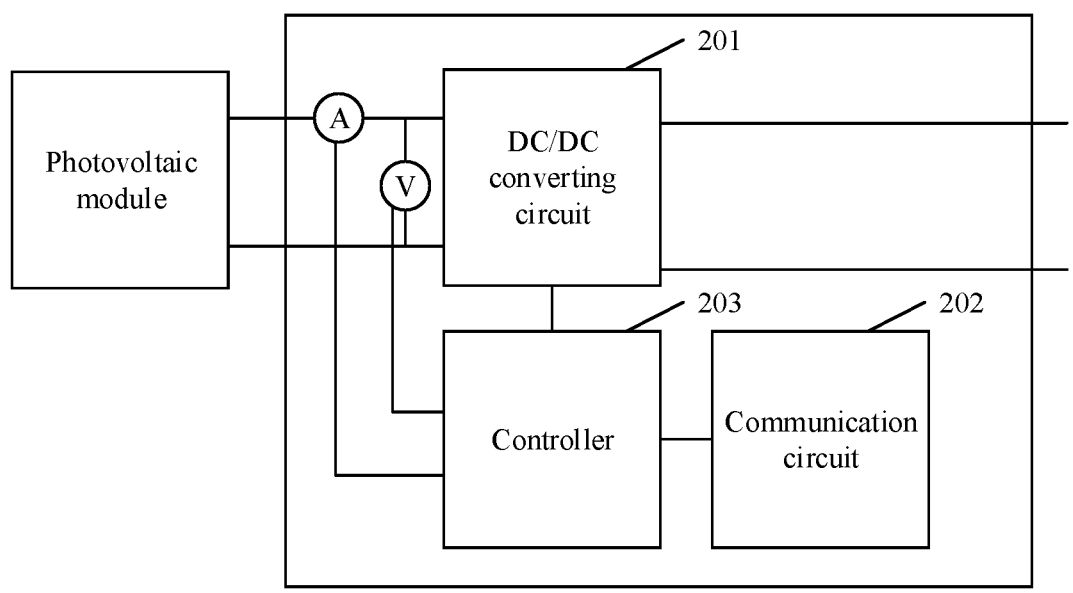
FIG. 4 is a schematic structural diagram of an optimizer according to an embodiment of the present disclosure.

An optimizer is further provided according to another embodiment of the present disclosure. The optimizer is applied to a photovoltaic generation system. An input end of the optimizer is connected to at least one photovoltaic module. Output ends of multiple said optimizers are connected in series with each other and then connected to an inverter. Referring to FIG. 4, the optimizer includes a DC/DC converting circuit 201, a current sensor A, a voltage sensor V, a communication circuit 202, and a controller 203.

The DC/DC converting circuit 201 is configured to control output power of the connected photovoltaic module.

The current sensor A is configured to detect an output current of the photovoltaic module.

The voltage sensor V is configured to detect an output voltage of the photovoltaic module.

The communication circuit 202 is configured to receive and forward an IV curve scan signal.

The controller 203 is configured to receive the IV curve scan signal forwarded by the communication circuit 202, control the output voltage of the photovoltaic module corresponding to the IV curve scan signal to change from an open-circuit voltage to a preset minimum voltage according to a preset rule to complete an IV curve scan, and record IV curve data of the photovoltaic module corresponding to the IV curve scan signal.

When the optimizer according to the present embodiment controls a corresponding photovoltaic module to perform the IV curve scan, a photovoltaic module connected to another optimizer can still operate normally, so that the system can operate normally. Different optimizers can perform the IV curve scan on the respective photovoltaic modules in response to the corresponding IV curve scan signals, thereby solving the problem in the conventional technologies that the operation status of a photovoltaic module cannot be detected during the system operation and an IV curve scan cannot be performed on a single photovoltaic module.

Apparently, in a practical application, the photovoltaic system may be stopped operating and all optimizers may be provided with IV curve scan signals, to complete IV curve scans for all photovoltaic modules of the entire photovoltaic system in a period of time.

In a practical application, the DC/DC converting circuit 201 may be configured based on a specific application environment, as long as the circuit has a voltage-boosting function. For example, the DC/DC converting circuit 201 may be configured as a Buck-Boost circuit shown in FIG. 5, which is only an example and is not intended to limit the present disclosure. All DC/DC converting circuits with the voltage-boosting function fall within the protection scope of the present disclosure.

Figure 6:
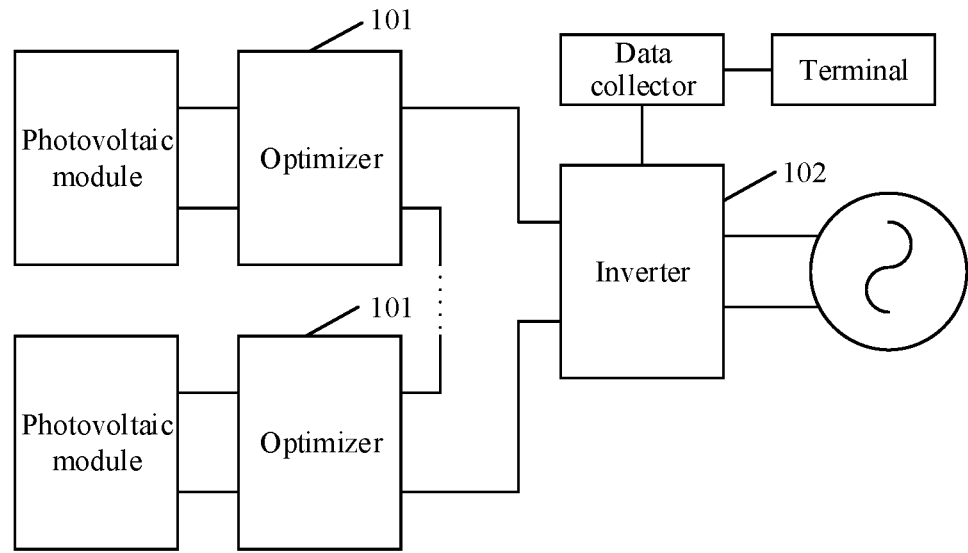
FIG. 6 is a schematic structural diagram of a photovoltaic generation system according to an embodiment of the present disclosure.

Preferably, as shown in FIG. 6, a controller (not shown in the figure) of an optimizer 101 is connected to a terminal, sequentially via the inverter 102 and a data collector. In some cases, for example, in a small photovoltaic system such as a household photovoltaic system, the data collector may be removed and the inverter is directly connected to the terminal for communication. The connection is not limited herein and may be determined based on an application environment, and all possible connections fall within the protection scope of the present disclosure.

Preferably, the controller communicates with the inverter 102 according to a power line communication (PLC) protocol.

FIG. 6 shows a photovoltaic generation system based on the optimizer. The optimizer 101 communicates with the inverter 102 for information exchange, in a PLC communication mode.

At least one photovoltaic module is connected to an input end of each optimizer 101, and output ends of the optimizers 101 are connected in series and then connected to the inverter 102. The optimizers 101 communicate with the inverter in the PLC communication mode. An alternating-current side of the inverter 102 inputs power to a power grid, and inputs the collected IV curve data of the photovoltaic modules to the data collector via a 485 bus. Then, the data collector uploads the data to the terminal via a network cable, for data processing by a background.

Figure 7:
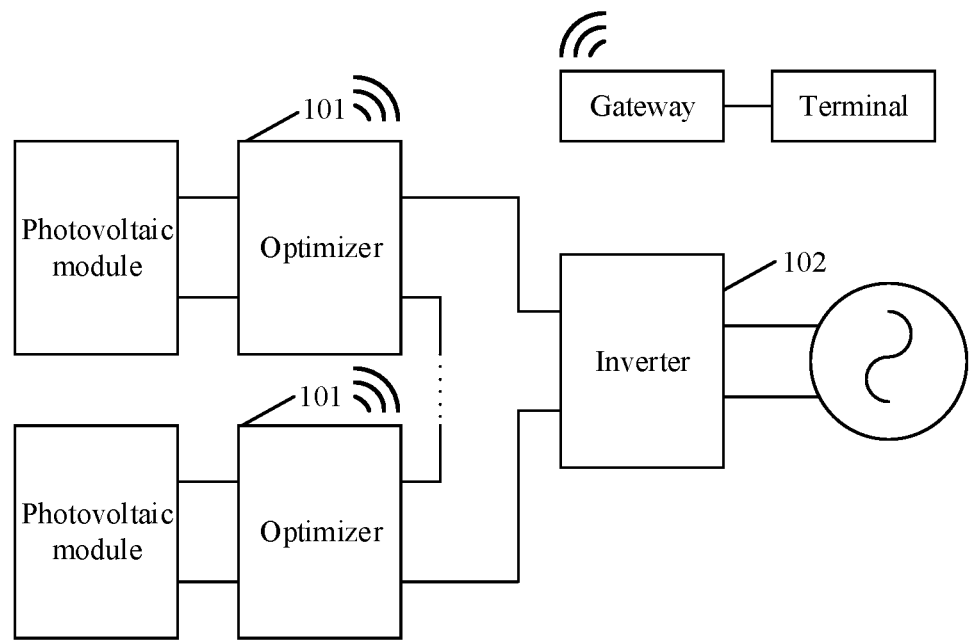
FIG. 7 is a schematic structural diagram of a photovoltaic generation system according to an embodiment of the present disclosure.

Apparently, in a practical application, the communication mode between the optimizer 101 and the outside may be changed. For example, a wireless communication technology such as Zigbee communication may be adopted, in which case a wireless communication gateway device should be added. Referring to FIG. 7, the controller (not shown in the figure) of the optimizer is connected to the terminal via a gateway, based on a wireless communication technology. In some cases, for example, in a case that the inverter and the power optimizer are installed close to each other, the gateway function may be integrated into the inverter. The arrangement of the gateway is not limited herein and may be determined based on an application environment, and all possible arrangements fall within the protection scope of the present disclosure.

Preferably, the controller communicates with the gateway in accordance with the Zigbee protocol.

The photovoltaic generation system shown in FIG. 7 has the same power transmission path as the system shown in FIG. 6, while has a different data transmission mode from the system shown in FIG. 6. In FIG. 7, the optimizer 101 communicates with the gateway in accordance with the Zigbee protocol. The optimizer 101 wirelessly transmits the IV curve data to the gateway and the gateway uploads the data to the terminal, for data processing by the background.

Preferably, a combiner box may be added between the optimizer 101 and the inverter 102, and the alternating current side of the inverter 102 may be connected to a boost transformer and then connected to the power grid, which may be determined based on an application environment and is not limited herein.

Preferably, based on FIG. 4, the controller 203 is further configured to compare the IV curve data with feature data of a preset IV curve, determine whether the IV curve data is abnormal, and upload an abnormity signal via the communication circuit 202 if the IV curve data is abnormal.

Alternatively, the communication circuit 202 is further configured to upload the IV curve data.

Preferably, the communication circuit 202 is a power line carrier communication circuit or a wireless communication circuit.

Figure 5:
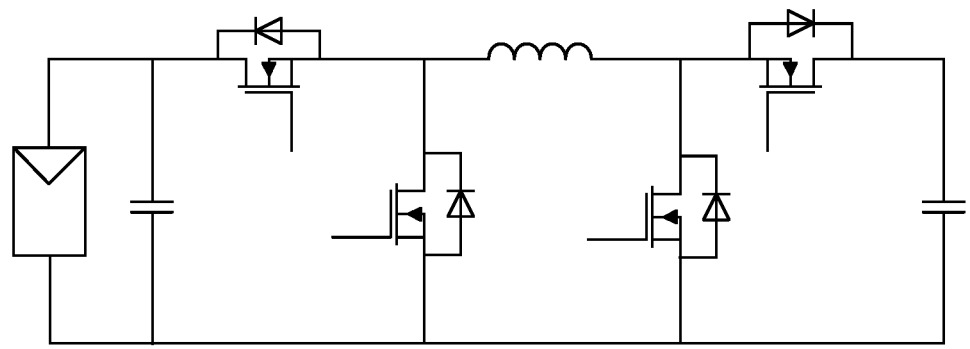
FIG. 5 is a schematic diagram of a DC/DC converting circuit according to an embodiment of the present disclosure.
Figure 8:
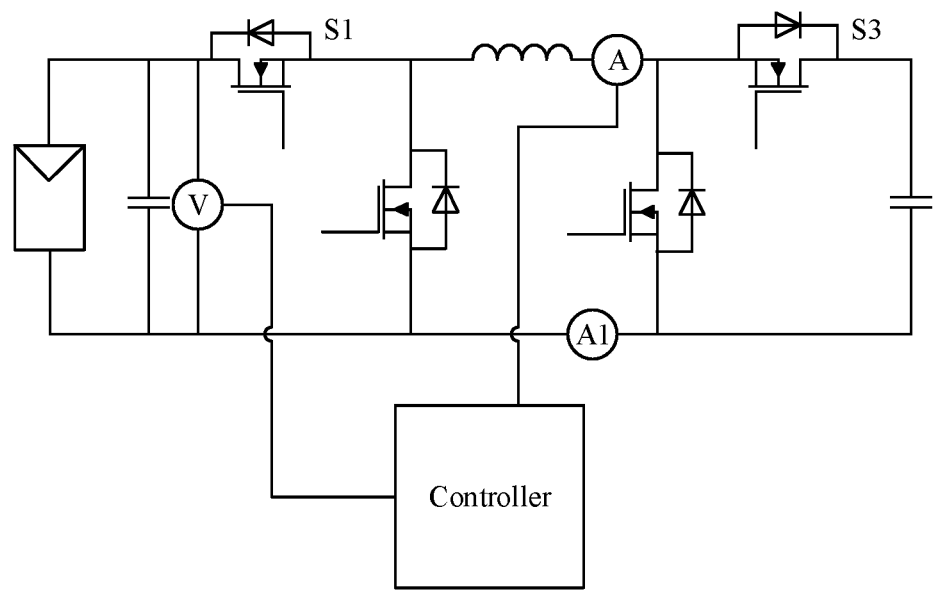
FIG. 8 is a schematic structural diagram of an optimizer according to an embodiment of the present disclosure.

In a practical application, in a case that the Buck-Boost circuit shown in FIG. 5 is adopted as the DC/DC converting circuit 201, the current sensor A may be arranged at a rear end of an inductor in the DC/DC converting circuit 201, as shown in FIG. 8. Apparently, the current sensor may also be arranged at another position, such as A1 shown in FIG. 8, for simplicity and convenience of the detection circuit.

In this case, the current sensor A is configured to detect a current of the inductor in the DC/DC converting circuit 201, so that the controller 203 calculates the output current of the photovoltaic module.

The controller 203 is further configured to calculate the output current of the photovoltaic module based on the current of the inductor and a duty ratio of a switch transistor S1 between the inductor in the DC/DC converting circuit 201 and the photovoltaic module.

For convenience in analysis, it is assumed that the inductor is in a continuous current mode, the current detected by the current sensor A is IL, the duty ratio of the switch transistor S1 is D, and the switch transistor S3 is at a through mode. In this case, the output current of the photovoltaic module is I=IL/D. Therefore, the output current of the photovoltaic module can be obtained by the controller 203 by measuring the current IL of the inductor and recording the above duty ratio D.

Figure 9:
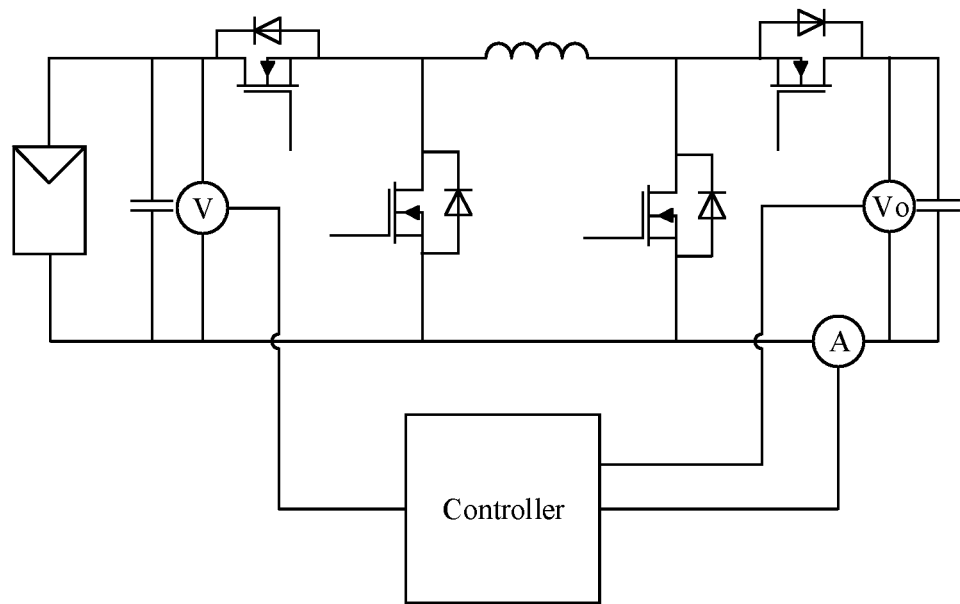
FIG. 9 is a schematic structural diagram of an optimizer according to an embodiment of the present disclosure.

In addition, the current sensor A may be further arranged at a negative electrode of the DC/DC converting circuit 201, as shown in FIG. 9. In this case, the current sensor A is configured to detect an output current of the DC/DC converting circuit 201, so that the controller 203 calculates the output current of the photovoltaic module.

The optimizer further includes another voltage sensor Vo configured to detect an output voltage of the DC/DC converting circuit 201.

The controller 203 is further configured to calculate power of the DC/DC converting circuit 201 based on the output voltage and the output current of the DC/DC converting circuit 201, and then calculate the output current of the photovoltaic module based on the output voltage of the photovoltaic module in accordance with a power balance rule.

It should be noted that, the input end of the optimizer 101 is connected to at least one photovoltaic module. That is, the input end of the optimizer 101 may be connected to one or two or more photovoltaic modules.

Figure 10:
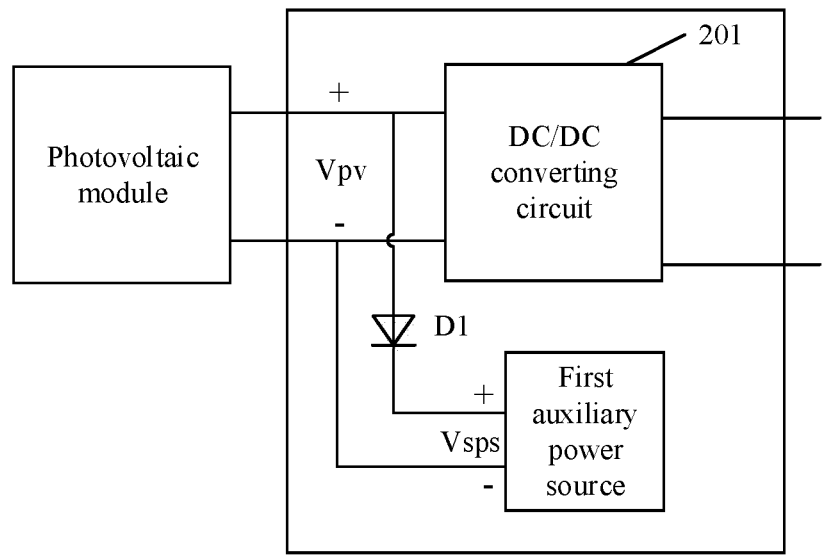
FIG. 10 is a schematic structural diagram of an optimizer according to an embodiment of the present disclosure.

In a case that the input end of the optimizer 101 is connected to only one photovoltaic module, the optimizer further includes a first diode and a first auxiliary power source, as shown in FIG. 10.

An anode of the first diode D1 is connected to a positive electrode of the photovoltaic module, and a cathode of the first diode D1 is connected to a positive electrode of an input end of the first auxiliary power source.

A negative electrode of the input end of the first auxiliary power source is connected to a negative electrode of the photovoltaic module.

The first auxiliary power source is configured to supply power to other circuits of the optimizer, such as a drive circuit, the controller 203, the voltage sensor circuit and the current sensor circuit of the DC/DC converting circuit 201.

The output voltage Vpv of the photovoltaic module decreases gradually when the optimizer performs an IV curve scan task. The first diode D1 can prevent the first auxiliary power source from losing power resulted from that an input voltage Vsps of the first auxiliary power source decreases excessively as the output voltage Vpv of photovoltaic module decreases.

Figure 11:
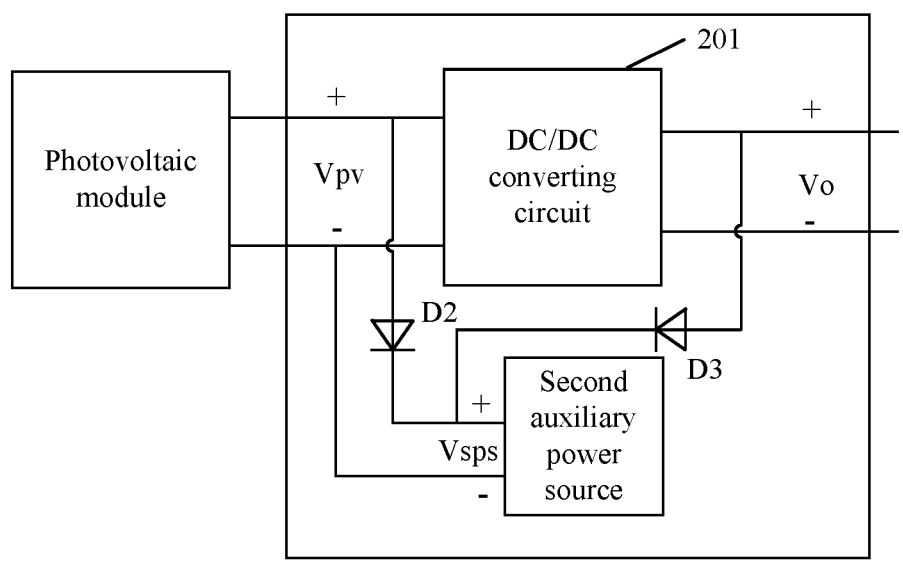
FIG. 11 is a schematic structural diagram of an optimizer according to an embodiment of the present disclosure.

Additionally, in a case that a positive electrode of an input end of the DC/DC converting circuit 201 is not connected to a positive electrode of an output end of the DC/DC converting circuit 201, and a negative electrode of the input end of the DC/DC converting circuit 201 is connected to a negative electrode of the output end of the DC/DC converting circuit 201 (as shown in FIG. 5), the optimizer further includes a second diode D2, a third diode D3, and a second auxiliary power source, as shown in FIG. 11.

An anode of the second diode D2 is connected to a positive electrode of the photovoltaic module, an anode of the third diode D3 is connected to the positive electrode of the output end of the DC/DC converting circuit, and cathodes of the second diode D2 and the third diode D3 are both connected to a positive electrode of an input end of the second auxiliary power source.

A negative electrode of the input end of the second auxiliary power source is connected to a negative electrode of the photovoltaic module, and the second auxiliary power source is configured to supply power to the optimizer.

During the operation of the optimizer, the second auxiliary power source is powered by a larger one of the output voltage Vpv of the photovoltaic module and the output voltage Vo of the DC/DC converting circuit 201. Therefore, when the optimizer performs the IV curve scan, an input voltage Vsps of the second auxiliary power source can still be maintained by the output voltage Vo of the DC/DC converting circuit 201, even if the output voltage Vpv of the photovoltaic module is low. Therefore, the second auxiliary power source can operates normally instead of lowing power.

Figure 12:
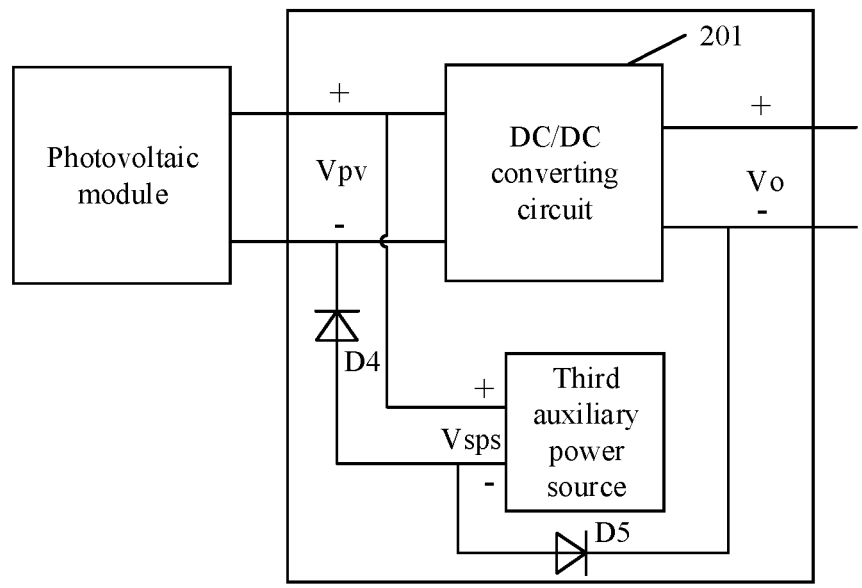
FIG. 12 is a schematic structural diagram of an optimizer according to an embodiment of the present disclosure.

Alternatively, in a case that a negative electrode of an input end of the DC/DC converting circuit 201 is not connected to a negative electrode of an output end of the DC/DC converting circuit 201 and a positive electrode of the input end of the DC/DC converting circuit 201 is connected to a positive electrode of the output end of the DC/DC converting circuit 201, the optimizer further includes a fourth diode D4, a fifth diode D5 and a third auxiliary power source, as shown in FIG. 12.

A cathode of the fourth diode D4 is connected to a negative electrode of the photovoltaic module, a cathode of the fifth diode D5 is connected to the negative electrode of the output end of the DC/DC converting circuit, and anodes of the fourth diode D4 and the fifth diode D5 are both connected to a negative electrode of an input end of the third auxiliary power source.

A positive electrode of the input end of the third auxiliary power source is connected to a positive electrode of the photovoltaic module, and the third auxiliary power source is configured to supply power to the optimizer.

Figure 13:
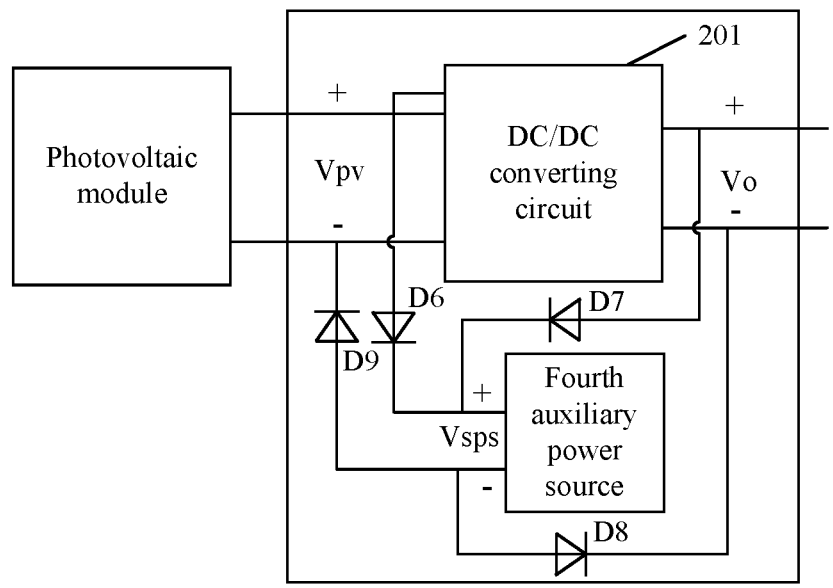
FIG. 13 is a schematic structural diagram of an optimizer according to an embodiment of the present disclosure.

Alternatively, in a case that a negative electrode of an input end of the DC/DC converting circuit 201 is not connected to a negative electrode of an output end of the DC/DC converting circuit 201 and a positive electrode of the input end of the DC/DC converting circuit 201 is not connected to a positive electrode of the output end of the DC/DC converting circuit 201, the optimizer further includes a sixth diode D6, a seventh diode D7, an eighth diode D8, a ninth diode D9 and a fourth auxiliary power source, as shown in FIG. 13.

An anode of the sixth diode D6 is connected to a positive electrode of the photovoltaic module, an anode of the seven diode D7 is connected to the positive electrode of the output end of the DC/DC converting circuit, and cathodes of the sixth diode D6 and the seventh diode D7 are both connected to a positive electrode of an input end of the fourth auxiliary power source.

A cathode of the eighth diode D8 is connected to a negative electrode of the photovoltaic module, a cathode of the ninth diode D9 is connected to the negative electrode of the output end of the DC/DC converting circuit, and anodes of the eighth diode D8 and the ninth diode D9 are both connected to a negative electrode of the input end of the fourth auxiliary power source.

The fourth auxiliary power source is configured to supply power to the optimizer.

Preferably, the optimizer may further include an energy storage circuit.

Figure 14:
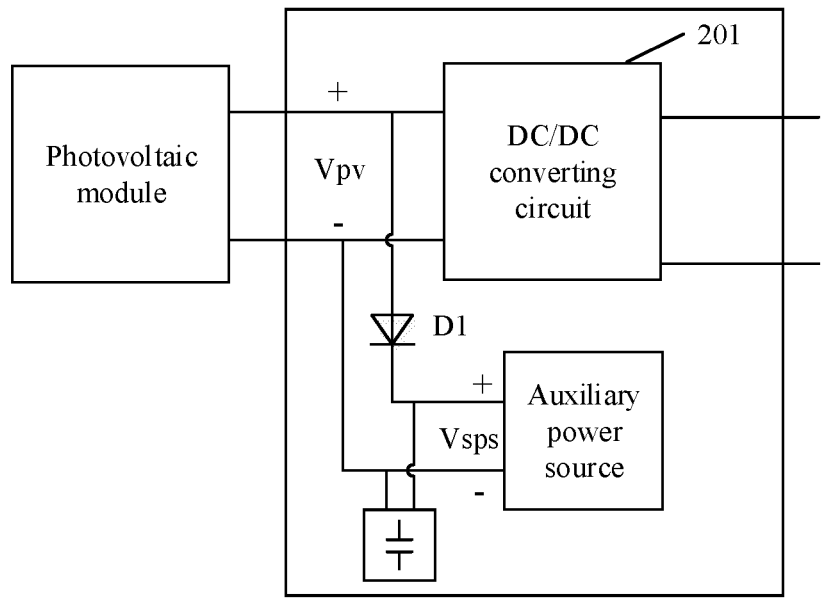
FIG. 14 is a schematic structural diagram of an optimizer according to an embodiment of the present disclosure.

Referring to FIG. 14, which illustrates based on FIG. 10, the energy storage circuit is connected between the positive electrode and negative electrode of the input end of the first auxiliary power source, and is configured to supply power to the first auxiliary power source during an IV curve scan performed by the optimizer.

Similarly, the energy storage circuit may be added to the circuits shown in FIG. 11, FIG. 12 or FIG. 13. The energy storage capacitor may be connected between the positive and negative electrodes of the input end of the respective auxiliary power source of the circuit shown in FIG. 11, FIG. 12 or FIG. 13, and configured to supply power to the auxiliary power source during an IV curve scan performed by the optimizer.

In a practical application, the energy storage circuit may include a capacitor, a super capacitor or a battery. The energy storage circuit is not limited herein and all possible energy storage circuits fall within the protection scope of the present disclosure.

Figure 15:
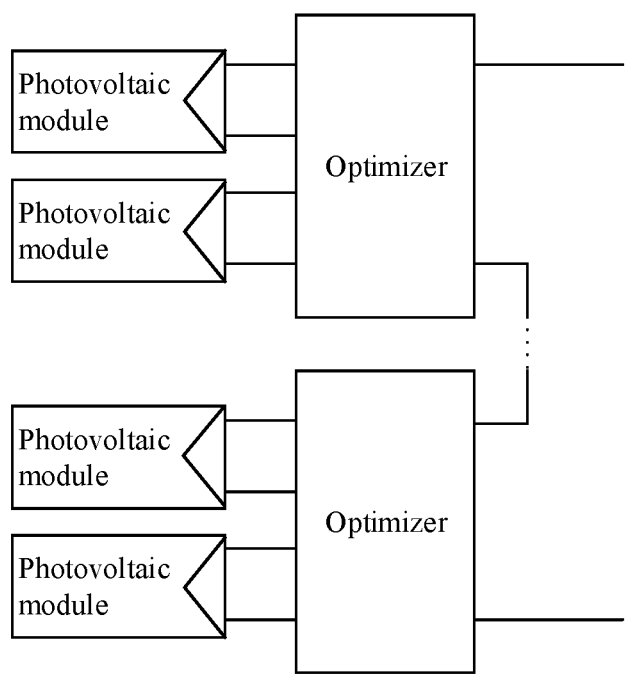
FIG. 15 is a schematic diagram of an application of an optimizer according to an embodiment of the present disclosure.

To address the issue that the auxiliary power source circuit in the system loses power during an IV curve scan performed on a photovoltaic module, two photovoltaic modules may be connected to the input end of the optimizer 101, as shown in FIG. 15. In this case, the auxiliary power source circuit can be powered by one photovoltaic module while an IV curve scan is performed on the other photovoltaic module.

Other operation principles are the same as the aforementioned embodiments, and are not described in detail hereinafter.

The embodiments of the present disclosure are described in a progressive manner, and each embodiment places emphasis on an aspect different from other embodiments. Therefore, the embodiments may be referred one to another for the same or similar parts.

The above description of the embodiments herein is for those skilled in the art to implement or use the present disclosure. Numerous modifications to the embodiments are apparent to those skilled in the art, and the general principles defined herein can be implemented in other embodiments without deviating from the spirit or scope of the present disclosure. Therefore, the present disclosure is not limited to the embodiments described herein, but is to conform to the widest scope consistent with the principles and novel features disclosed herein.

The invention claimed is:

1. A current-voltage (IV) curve scan method for a photovoltaic module, applied to one optimizer in a plurality to optimizers connected in series in a photovoltaic generation system, wherein an input end of each optimizer is connected to at least one photovoltaic module, output ends of the plurality of the optimizers are connected to an inverter, the IV curve scan method comprises:
   receiving, by the optimizer, an IV curve scan signal sent from a control device;
   controlling, by the optimizer, an output voltage of the at least one photovoltaic module corresponding to the optimizer to change from an open-circuit voltage to a preset minimum voltage according to a preset rule, to complete an IV curve scan;
   acquiring, by the optimizer, an output current of the at least one photovoltaic module corresponding to the optimizer;
   acquiring, by the optimizer, an output voltage of the at least one photovoltaic module corresponding to the optimizer; and
   recording, by the optimizer, IV curve data of the at least one photovoltaic module corresponding to the optimizer, based on the output current and the output voltage;
   wherein acquiring, by the optimizer, the output current of the at least one photovoltaic module corresponding to the optimizer comprises:
   detecting a current of an inductor in a direct current/direct current (DC/DC) converting circuit of the optimizer, and calculating the output current of the photovoltaic module based on the current of the inductor and a duty ratio of a switch transistor connected between the inductor in the DC/DC converting circuit and the photovoltaic module, or
   detecting an output current of a DC/DC converting circuit of the optimizer; detecting an output voltage of the DC/DC converting circuit, calculating output power of the DC/DC converting circuit based on the output voltage and the output current of the DC/DC converting circuit; and calculating the output current of the photovoltaic module based on the output voltage of the photovoltaic module in accordance with a power balance principle.

2. The IV curve scan method for the photovoltaic module according to claim 1, after the recording the IV curve data of the at least one photovoltaic module corresponding to the optimizer, further comprising:
   comparing the IV curve data with feature data of a preset IV curve, determining whether the IV curve data is abnormal, and uploading an abnormity signal if the IV curve data is abnormal; or
   uploading the IV curve data.

3. The IV curve scan method for the photovoltaic module according to claim 2, wherein the preset rule is at least one of a voltage decreasing rule with a fixed voltage difference, a parabolic voltage decreasing rule and a voltage decreasing rule with a fixed duty ratio change rate.

4. The IV curve scan method for the photovoltaic module according to claim 1, wherein the preset rule is at least one of a voltage decreasing rule with a fixed voltage difference, a parabolic voltage decreasing rule and a voltage decreasing rule with a fixed duty ratio change rate.

5. An optimizer, applied to a photovoltaic generation system, wherein the optimizer is one of a plurality of optimizers connected in series in the photovoltaic generation system, an input end of each optimizer is connected to at least one photovoltaic module, output ends of the plurality of the optimizers are connected to an inverter, and the optimizer comprises:
- a direct current/direct current (DC/DC) converting circuit, configured to control output power of the photovoltaic module connected to the optimizer;
- a current sensor, configured to perform a detection for acquiring an output current of the photovoltaic module;
- a voltage sensor, configured to perform a detection for acquiring an output voltage of the photovoltaic module;
- a communication circuit, configured to receive a current-voltage (IV) curve scan signal sent from a control device and forward the IV curve scan signal; and
- a controller, configured to receive the IV curve scan signal forwarded by the communication circuit, control the output voltage of the at least one photovoltaic module corresponding to the optimizer to change from an open-circuit voltage to a preset minimum voltage according to a preset rule to complete an IV curve scan, and record IV curve data of the at least one photovoltaic module corresponding to the optimizer based on the output current and the output voltage;
- wherein the current sensor is configured to detect a current of an inductor in the DC/DC converting circuit of the optimizer; and the controller is configured to calculate the output current of the photovoltaic module based on the current of the inductor and a duty ratio of a switch transistor connected between the inductor in the DC/DC converting circuit and the photovoltaic module; or
- wherein the current sensor is configured to detect an output current of the DC/DC converting circuit; the optimizer further comprises another voltage sensor configured to detect an output voltage of the DC/DC converting circuit; and the controller is further configured to calculate output power of the DC/DC converting circuit based on both the output voltage and the output current of the DC/DC converting circuit, and calculate the output current of the photovoltaic module based on the output voltage of the photovoltaic module in accordance with a power balance principle.

6. The optimizer according to claim 5, wherein
the controller is further configured to compare the IV curve data with feature data of a preset IV curve, determine whether the IV curve data is abnormal, and upload an abnormity signal via the communication circuit if the IV curve data is abnormal; or
the communication circuit is further configured to upload the IV curve data.

7. The optimizer according to claim 6, further comprising a first diode and a first auxiliary power source, wherein
an anode of the first diode is connected to a positive electrode of the at least one photovoltaic module, a cathode of the first diode is connected to a positive electrode of an input end of the first auxiliary power source; and
a negative electrode of the input end of the first auxiliary power source is connected to a negative electrode of the at least one photovoltaic module, and the first auxiliary power source is configured to supply power to the optimizer.

8. The optimizer according to claim 7, further comprising an energy storage circuit, wherein
the energy storage circuit is connected between the positive electrode and the negative electrode of the input end of the first auxiliary power source, and is configured to supply power to the first auxiliary power source during the IV curve scan performed by the optimizer.

9. The optimizer according to claim 6, wherein,
in a case that a negative electrode of an input end of the DC/DC converting circuit is connected to a negative electrode of an output end of the DC/DC converting circuit, and a positive electrode of the input end of the DC/DC converting circuit is not connected to a positive electrode of the output end of the DC/DC converting circuit, the optimizer further comprises a second diode, a third diode and a second auxiliary power source, wherein
an anode of the second diode is connected to a positive electrode of the at least one photovoltaic module, an anode of the third diode is connected to a positive electrode of the output end of the DC/DC converting circuit, and a cathode of the second diode and a cathode of the third diode are both connected to a positive electrode of an input end of the second auxiliary power source; and
a negative electrode of the input end of the second auxiliary power source is connected to a negative electrode of the at least one photovoltaic module, and the second auxiliary power source is configured to supply power to the optimizer;
in a case that the positive electrode of the input end of the DC/DC converting circuit is connected to the positive electrode of the output end of the DC/DC converting circuit, and the negative electrode of the input end of the DC/DC converting circuit is not connected to the negative electrode of the output end of the DC/DC converting circuit, the optimizer further comprises a fourth diode, a fifth diode and a third auxiliary power source, wherein
a cathode of the fourth diode is connected to a negative electrode of the at least one photovoltaic module, a cathode of the fifth diode is connected to a negative electrode of the output end of the DC/DC converting circuit, and an anode of the fourth diode and an anode of the fifth diode are both connected to a negative electrode of an input end of the third auxiliary power source; and
a positive electrode of the input end of the third auxiliary power source is connected to a positive electrode of the at least one photovoltaic module, and the third auxiliary power source is configured to supply power to the optimizer; and
in a case that the negative electrode of the input end of the DC/DC converting circuit is not connected to the negative electrode of the output end of the DC/DC converting circuit and the positive electrode of the input end of the DC/DC converting circuit is not connected to the positive electrode of the output end of the DC/DC converting circuit, the optimizer further comprises a sixth diode, a seventh diode, an eighth diode, a ninth diode and a fourth auxiliary power source, wherein
an anode of the sixth diode is connected to a positive electrode of the at least one photovoltaic module, an anode of the seventh diode is connected to the positive electrode of the output end of the DC/DC converting circuit, and a cathode of the sixth diode and a cathode of the seventh diode are both connected to a positive electrode of an input end of the fourth auxiliary power source;

a cathode of the eighth diode is connected to a negative electrode of the at least one photovoltaic module, a cathode of the ninth diode is connected to the negative electrode of the output end of the DC/DC converting circuit, and an anode of the eighth diode and an anode of the ninth diode are both connected to a negative electrode of the input end of the fourth auxiliary power source; and the fourth auxiliary power source is configured to supply power to the optimizer.

10. The optimizer according to claim 5, wherein the communication circuit is a power line carrier communication circuit or a wireless communication circuit.

11. The optimizer according to claim 10, further comprising a first diode and a first auxiliary power source, wherein an anode of the first diode is connected to a positive electrode of the at least one photovoltaic module, a cathode of the first diode is connected to a positive electrode of an input end of the first auxiliary power source; and a negative electrode of the input end of the first auxiliary power source is connected to a negative electrode of the at least one photovoltaic module, and the first auxiliary power source is configured to supply power to the optimizer.

12. The optimizer according to claim 11, further comprising an energy storage circuit, wherein the energy storage circuit is connected between the positive electrode and the negative electrode of the input end of the first auxiliary power source, and is configured to supply power to the first auxiliary power source during the IV curve scan performed by the optimizer.

13. The optimizer according to claim 10, wherein, in a case that a negative electrode of an input end of the DC/DC converting circuit is connected to a negative electrode of an output end of the DC/DC converting circuit, and a positive electrode of the input end of the DC/DC converting circuit is not connected to a positive electrode of the output end of the DC/DC converting circuit, the optimizer further comprises a second diode, a third diode and a second auxiliary power source, wherein an anode of the second diode is connected to a positive electrode of the at least one photovoltaic module, an anode of the third diode is connected to a positive electrode of the output end of the DC/DC converting circuit, and a cathode of the second diode and a cathode of the third diode are both connected to a positive electrode of an input end of the second auxiliary power source; and a negative electrode of the input end of the second auxiliary power source is connected to a negative electrode of the at least one photovoltaic module, and the second auxiliary power source is configured to supply power to the optimizer;

in a case that the positive electrode of the input end of the DC/DC converting circuit is connected to the positive electrode of the output end of the DC/DC converting circuit, and the negative electrode of the input end of the DC/DC converting circuit is not connected to the negative electrode of the output end of the DC/DC converting circuit, the optimizer further comprises a fourth diode, a fifth diode and a third auxiliary power source, wherein a cathode of the fourth diode is connected to a negative electrode of the at least one photovoltaic module, a cathode of the fifth diode is connected to a negative electrode of the output end of the DC/DC converting circuit, and an anode of the fourth diode and an anode of the fifth diode are both connected to a negative electrode of an input end of the third auxiliary power source; and a positive electrode of the input end of the third auxiliary power source is connected to a positive electrode of the at least one photovoltaic module, and the third auxiliary power source is configured to supply power to the optimizer; and in a case that the negative electrode of the input end of the DC/DC converting circuit is not connected to the negative electrode of the output end of the DC/DC converting circuit and the positive electrode of the input end of the DC/DC converting circuit is not connected to the positive electrode of the output end of the DC/DC converting circuit, the optimizer further comprises a sixth diode, a seventh diode, an eighth diode, a ninth diode and a fourth auxiliary power source, wherein an anode of the sixth diode is connected to a positive electrode of the at least one photovoltaic module, an anode of the seventh diode is connected to the positive electrode of the output end of the DC/DC converting circuit, and a cathode of the sixth diode and a cathode of the seventh diode are both connected to a positive electrode of an input end of the fourth auxiliary power source;

a cathode of the eighth diode is connected to a negative electrode of the at least one photovoltaic module, a cathode of the ninth diode is connected to the negative electrode of the output end of the DC/DC converting circuit, and an anode of the eighth diode and an anode of the ninth diode are both connected to a negative electrode of the input end of the fourth auxiliary power source; and the fourth auxiliary power source is configured to supply power to the optimizer.

14. The optimizer according to claim 5, further comprising a first diode and a first auxiliary power source, wherein an anode of the first diode is connected to a positive electrode of the at least one photovoltaic module, a cathode of the first diode is connected to a positive electrode of an input end of the first auxiliary power source; and a negative electrode of the input end of the first auxiliary power source is connected to a negative electrode of the at least one photovoltaic module, and the first auxiliary power source is configured to supply power to the optimizer.

15. The optimizer according to claim 14, further comprising an energy storage circuit, wherein the energy storage circuit is connected between the positive electrode and the negative electrode of the input end of the first auxiliary power source, and is configured to supply power to the first auxiliary power source during the IV curve scan performed by the optimizer.

16. The optimizer according to claim 5, further comprising a first diode and a first auxiliary power source, wherein an anode of the first diode is connected to a positive electrode of the photovoltaic module, a cathode of the first diode is connected to a positive electrode of an input end of the first auxiliary power source; and a negative electrode of the input end of the first auxiliary power source is connected to a negative electrode of the photovoltaic module, and the first auxiliary power source is configured to supply power to the optimizer.

17. The optimizer according to claim 16, further comprising an energy storage circuit, wherein
the energy storage circuit is connected between the positive electrode and the negative electrode of the input end of the first auxiliary power source, and is configured to supply power to the first auxiliary power source during the IV curve scan performed by the optimizer.

18. The optimizer according to claim 5, wherein,
in a case that a negative electrode of an input end of the DC/DC converting circuit is connected to a negative electrode of an output end of the DC/DC converting circuit, and a positive electrode of the input end of the DC/DC converting circuit is not connected to a positive electrode of the output end of the DC/DC converting circuit, the optimizer further comprises a second diode, a third diode and a second auxiliary power source, wherein
an anode of the second diode is connected to a positive electrode of the at least one photovoltaic module, an anode of the third diode is connected to a positive electrode of the output end of the DC/DC converting circuit, and a cathode of the second diode and a cathode of the third diode are both connected to a positive electrode of an input end of the second auxiliary power source; and
a negative electrode of the input end of the second auxiliary power source is connected to a negative electrode of the at least one photovoltaic module, and the second auxiliary power source is configured to supply power to the optimizer;
in a case that the positive electrode of the input end of the DC/DC converting circuit is connected to the positive electrode of the output end of the DC/DC converting circuit, and the negative electrode of the input end of the DC/DC converting circuit is not connected to the negative electrode of the output end of the DC/DC converting circuit, the optimizer further comprises a fourth diode, a fifth diode and a third auxiliary power source, wherein
a cathode of the fourth diode is connected to a negative electrode of the at least one photovoltaic module, a cathode of the fifth diode is connected to a negative electrode of the output end of the DC/DC converting circuit, and an anode of the fourth diode and an anode of the fifth diode are both connected to a negative electrode of an input end of the third auxiliary power source; and
a positive electrode of the input end of the third auxiliary power source is connected to a positive electrode of the at least one photovoltaic module, and the third auxiliary power source is configured to supply power to the optimizer; and
in a case that the negative electrode of the input end of the DC/DC converting circuit is not connected to the negative electrode of the output end of the DC/DC converting circuit and the positive electrode of the input end of the DC/DC converting circuit is not connected to the positive electrode of the output end of the DC/DC converting circuit, the optimizer further comprises a sixth diode, a seventh diode, an eighth diode, a ninth diode and a fourth auxiliary power source, wherein an anode of the sixth diode is connected to a positive electrode of the at least one photovoltaic module, an anode of the seventh diode is connected to the positive electrode of the output end of the DC/DC converting circuit, and a cathode of the sixth diode and a cathode of the seventh diode are both connected to a positive electrode of an input end of the fourth auxiliary power source;
a cathode of the eighth diode is connected to a negative electrode of the at least one photovoltaic module, a cathode of the ninth diode is connected to the negative electrode of the output end of the DC/DC converting circuit, and an anode of the eighth diode and an anode of the ninth diode are both connected to a negative electrode of the input end of the fourth auxiliary power source; and
the fourth auxiliary power source is configured to supply power to the optimizer.

19. The optimizer according to claim 5, wherein,
in a case that a negative electrode of an input end of the DC/DC converting circuit is connected to a negative electrode of an output end of the DC/DC converting circuit, and a positive electrode of the input end of the DC/DC converting circuit is not connected to a positive electrode of the output end of the DC/DC converting circuit, the optimizer further comprises a second diode, a third diode and a second auxiliary power source, wherein
an anode of the second diode is connected to a positive electrode of the at least one photovoltaic module, an anode of the third diode is connected to a positive electrode of the output end of the DC/DC converting circuit, and a cathode of the second diode and a cathode of the third diode are both connected to a positive electrode of an input end of the second auxiliary power source; and
a negative electrode of the input end of the second auxiliary power source is connected to a negative electrode of the at least one photovoltaic module, and the second auxiliary power source is configured to supply power to the optimizer;
in a case that the positive electrode of the input end of the DC/DC converting circuit is connected to the positive electrode of the output end of the DC/DC converting circuit, and the negative electrode of the input end of the DC/DC converting circuit is not connected to the negative electrode of the output end of the DC/DC converting circuit, the optimizer further comprises a fourth diode, a fifth diode and a third auxiliary power source, wherein
a cathode of the fourth diode is connected to a negative electrode of the at least one photovoltaic module, a cathode of the fifth diode is connected to a negative electrode of the output end of the DC/DC converting circuit, and an anode of the fourth diode and an anode of the fifth diode are both connected to a negative electrode of an input end of the third auxiliary power source; and
a positive electrode of the input end of the third auxiliary power source is connected to a positive electrode of the at least one photovoltaic module, and the third auxiliary power source is configured to supply power to the optimizer; and
in a case that the negative electrode of the input end of the DC/DC converting circuit is not connected to the negative electrode of the output end of the DC/DC converting circuit and the positive electrode of the input end of the DC/DC converting circuit is not connected to the positive electrode of the output end of the DC/DC converting circuit, the optimizer further comprises a sixth diode, a seventh diode, an eighth diode, a ninth diode and a fourth auxiliary power source, wherein an anode of the sixth diode is connected to a positive electrode of the at least one photovoltaic module, an anode of the seventh diode is connected to the positive electrode of the output end of the DC/DC converting circuit, and a cathode of the sixth diode and a cathode of the seventh diode are both connected to a positive electrode of an input end of the fourth auxiliary power source;

a cathode of the eighth diode is connected to a negative electrode of the at least one photovoltaic module, a cathode of the ninth diode is connected to the negative electrode of the output end of the DC/DC converting circuit, and an anode of the eighth diode and an anode of the ninth diode are both connected to a negative electrode of the input end of the fourth auxiliary power source; and the fourth auxiliary power source is configured to supply power to the optimizer.

\* \* \* \* \*